(12) United States Patent
Martin et al.

(10) Patent No.: US 11,811,210 B2
(45) Date of Patent: Nov. 7, 2023

(54) MODULAR FLOOR BOX ASSEMBLY

(71) Applicant: ABB Schweiz AG, Baden (CH)

(72) Inventors: Michael D. Martin, Rochester, NY (US); Michael Devin O'Neil, Germantown, TN (US); Phillip Taylor, Germantown, TN (US)

(73) Assignee: ABB SCHWEIZ AG, Baden (CH)

( * ) Notice: Subject to any disclaimer, the term of this patent is extended or adjusted under 35 U.S.C. 154(b) by 84 days.

(21) Appl. No.: 17/320,440

(22) Filed: May 14, 2021

(65) Prior Publication Data

US 2021/0376587 A1 Dec. 2, 2021

Related U.S. Application Data

(60) Provisional application No. 63/029,824, filed on May 26, 2020.

(51) Int. Cl.
*H02G 3/18* (2006.01)
*H02G 3/08* (2006.01)
(Continued)

(52) U.S. Cl.
CPC ............. *H02G 3/185* (2013.01); *H02G 3/083* (2013.01)

(58) Field of Classification Search
CPC ...... H05K 5/0247; H01R 24/76; H01R 27/02; H02G 3/083; H02G 3/18; H02G 3/185
See application file for complete search history.

(56) References Cited

U.S. PATENT DOCUMENTS 3,609,647 A * 9/1971 Castellano ............. H01R 27/00
174/53
3,707,697 A * 12/1972 Izumi ..................... H01R 31/02
439/107
(Continued)

FOREIGN PATENT DOCUMENTS

JP H0538023 A 2/1993

OTHER PUBLICATIONS

Extended European Search Report, issued by the European Patent Office, regarding corresponding patent application Serial No. EP 21175868.5; dated Feb. 1, 2022; 13 pages.
(Continued)

*Primary Examiner* — Hoa C Nguyen
*Assistant Examiner* — Amol H Patel
(74) *Attorney, Agent, or Firm* — Greenberg Traurig, LLP

(57) ABSTRACT

A modular floor box assembly that includes a floor box having a plurality of fittings having passageways for power and data transmission cables. A power deck configured for placement within the interior region of the floor box can include a female deck receptor that is electrically coupled to one or more terminals that are configured for a hardwired connection with at least one of the power transmission cables. The floor box can include an aperture within the interior region adjacent to the power deck that is sized to accommodate passage of data transmission cables, and which is in fluid communication with the passageways. The assembly further includes a removable power puck having a male receptacle configured for plugging into the female deck receptor. The power puck can further include one or more electrical receptacles for electrical coupling to power plugs of external devices, and at least one data opening.

20 Claims, 10 Drawing Sheets

(51) Int. Cl.
*H01R 27/02* (2006.01)
*H01R 24/76* (2011.01)

(56) References Cited

U.S. PATENT DOCUMENTS

| | | | | |
|---|---|---|---|---|
| 5,243,129 | A * | 9/1993 | Bates | H02G 3/185 |
| | | | | 52/263 |
| 5,340,326 | A * | 8/1994 | LeMaster | H01R 25/00 |
| | | | | 439/540.1 |
| 5,783,774 | A | 7/1998 | Bowman et al. | |
| 6,417,446 | B1 | 7/2002 | Whitehead | |
| 7,323,638 | B1 * | 1/2008 | Radosavljevic | H02G 3/086 |
| | | | | 174/53 |
| 9,941,679 | B1 | 4/2018 | Gretz | |
| 10,283,951 | B1 | 5/2019 | Gretz | |
| 2008/0053697 | A1 | 3/2008 | Bowman | |
| 2008/0160826 | A1 | 7/2008 | Lemoureux et al. | |
| 2011/0005799 | A1 * | 1/2011 | Drane | H02G 3/185 |
| | | | | 174/54 |
| 2014/0000956 | A1 * | 1/2014 | Wurms | H02G 3/08 |
| | | | | 174/535 |
| 2019/0006830 | A1 | 1/2019 | Richards et al. | |
| 2019/0280470 | A1 * | 9/2019 | Jolly | H01H 36/0006 |
| 2020/0052471 | A1 | 2/2020 | Byrne et al. | |
| 2021/0203099 | A1 * | 7/2021 | Li | H02G 3/18 |

OTHER PUBLICATIONS

Australian Examination Report (No. 1), issued by the Australian Government IP Australia, regarding corresponding patent application Serial No. AU 2021203362; dated Feb. 23, 2022; 8 pages.
Canadian Examination Report, issued by the Canadian Patent Office, regarding corresponding patent application Serial No. CA 3,119,637; dated Sep. 8, 2022; 7 pages.

* cited by examiner

MODULAR FLOOR BOX ASSEMBLY

FIELD OF INVENTION

The present invention relates to floor boxes, and more particularly, to modular floor box assemblies.

BACKGROUND

The assembly of an electrical device to a floor box can often involve an electrician modifying the configuration of the floor box so that the floor box can accommodate the electrical device. Additionally, subsequent repairs or modifications to the electrical device, and/or to the associated supports of the electrical device, can sometimes necessitate the replacement of the floor box. Yet, as floor boxes can be secured in a variety of different types of floors, including, for example, concrete floors, such replacement can involve relatively significant demolition, and subsequent repairing, of the floor, which can be relatively costly, time consuming, and disruptive.

Accordingly, although various types of floor boxes are currently available in the marketplace, further improvements are possible to provide a means for providing modular floor boxes.

BRIEF SUMMARY

An aspect of an embodiment of the present application is a modular floor box assembly that includes a floor box having a housing, the housing including a plurality of fittings, each of the plurality of fittings having a passageway sized to receive a plurality of cables, the passageway being in fluid communication with an interior region of the housing. The modular floor box assembly can further include a power deck configured for placement within the interior region of the housing, the power deck including a female deck receptor that is electrically coupled to one or more terminals of the floor box that are configured for a hardwired connection within the interior region with at least one of the plurality of cables. Additionally, the housing can include an aperture within the interior region between the power deck and an opposing inner surface of the housing, the aperture being sized to accommodate passage of one or more data transmission cables, and is in fluid communication with the passageway of at least one of the plurality of fittings. Additionally, a power puck can be sized for removable placement within the interior region of the housing, the power puck having a male receptacle configured for insertion into, and electrical coupling to, the female deck receptor. The power puck can further include one or more electrical receptacles and at least one data opening, the one or more electrical receptacles being electrically coupled to the male receptacle.

Another aspect of an embodiment of the present application is a modular floor box assembly that can include a floor box having a housing, a first fitting, and a second fitting, the housing having a sidewall and a bottom wall, the sidewall and the bottom wall defining an interior region of the housing, and each of the first fitting and the second fitting having a passageway that is in fluid communication with the interior region. The modular floor box assembly can also include a power deck having a deck housing that includes a female deck receptor, and a power terminal block having a plurality of terminals, each terminal of the plurality of terminals being configured for a hardwired connection with a power transmission cable received into the interior region through the first fitting. Further, the power terminal block can be electrically coupled to the female deck receptor. The modular floor box assembly can also include a power puck having a male receptacle sized and positioned to be plugged into the female deck receptor to electrically couple the male receptacle to the female deck receptor. The power puck can be selectively removable from the floor box, and can further include one or more electrical receptacles electrically coupled to the male receptacle and at least one data opening.

Additionally, an aspect of an embodiment of the present application is a method that comprises hardwiring one or more power transmission cables to a power terminal block, the power terminal block being electrically coupled to a power deck of a floor box, and positioning one or more data transmission cables in an interior region of the floor box. Additionally, a power puck can be inserted into the interior region of the floor box, and, with the power deck in the interior region of the floor box, a male receptacle of the power puck can be plugged into a female deck receptor of the power deck, the female deck receptor being electrically coupled to the power terminal block. Further, an electrical receptacle of the power puck can be connected to a power cable for an external device, the electrical receptacle being electrically coupled to the male receptacle. The method can also include inserting the one or more data transmission cables through an aperture between the power deck and an interior surface of the floor box, and into a data opening in the power puck.

These and other aspects of the present invention will be better understood in view of the drawings and following detailed description.

BRIEF DESCRIPTION OF THE DRAWINGS

The description herein makes reference to the accompanying figures wherein like reference numerals refer to like parts throughout the several views.

Figure 1:
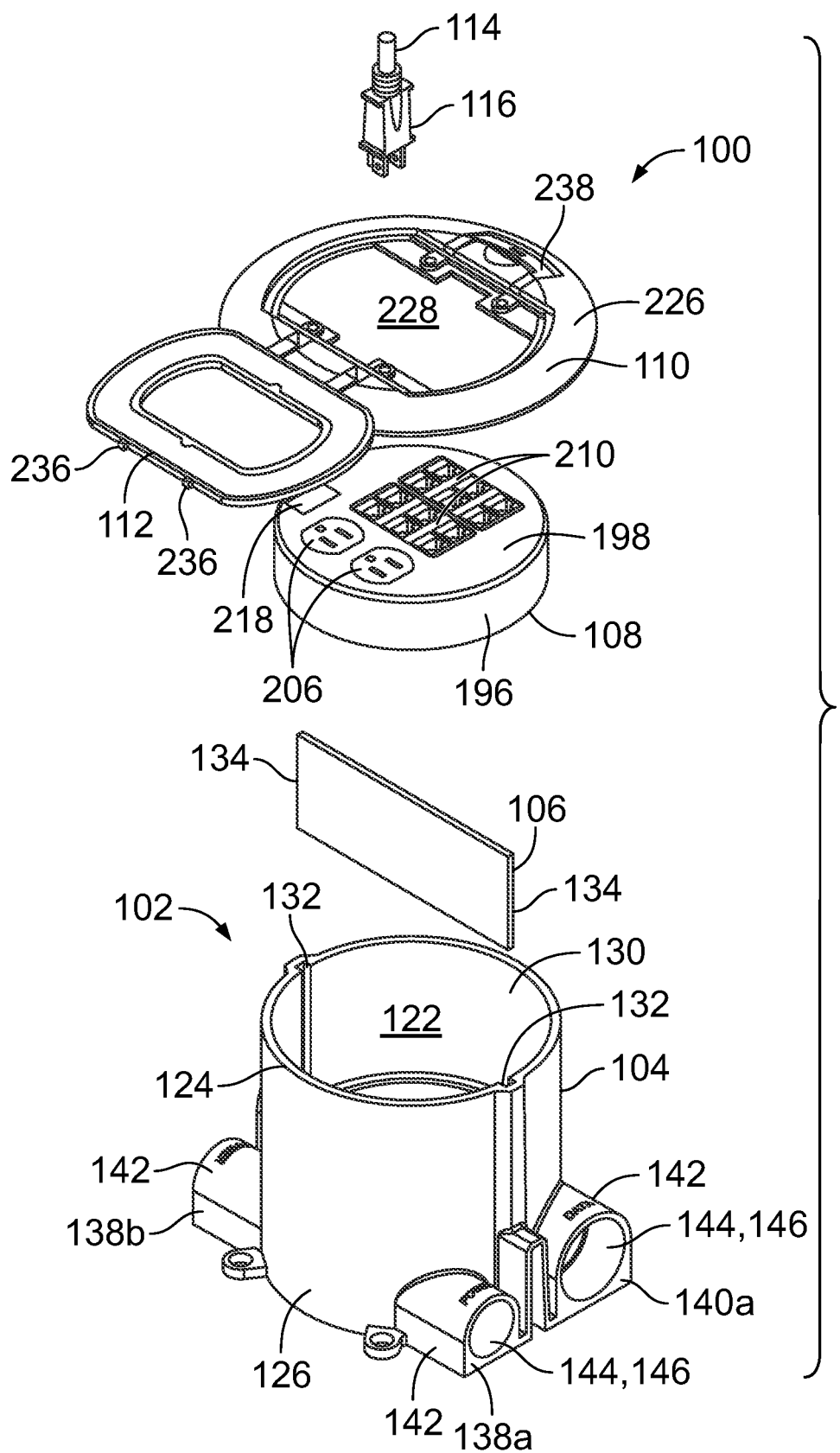
FIG. 1 illustrates an exploded view of a modular floor box assembly according to an embodiment of the present application.

The foregoing summary, as well as the following detailed description of certain embodiments of the present application, will be better understood when read in conjunction with the appended drawings. For the purpose of illustrating the application, there is shown in the drawings, certain embodiments. It should be understood, however, that the present application is not limited to the arrangements and instrumentalities shown in the attached drawings. Further, like numbers in the respective figures indicate like or comparable parts.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

FIG. 1 illustrates an exploded view of a modular floor box assembly 100 according to an embodiment of the present application. The modular floor box assembly 100 can include a floor box 102 having a housing 104 and a voltage divider 106, a power puck 108, and a cover assembly comprising a cover flange 110 and a cover lid 112, among other components.

As discussed below, the power puck 108 can be a plug and play type device with respect to at least the transmission of electrical power, and can thus be configured to be indirectly electrically coupled to power transmission cables or wires (collectively referred to herein as cables) that are hardwired to the modular floor box assembly 100 at a lower, power layer 174 (FIG. 3) of the housing 104. Additionally, the power puck 108 can be configured to accommodate selective electrical coupling of the power puck 108 to a variety of different types of electrical devices in a variety of manners such that the power puck 108 can provide a means for electrical transmission to those other electrical devices. Accordingly, the power puck 108 can have a variety of shapes, sizes, and configurations so as to accommodate electrical transmission through a variety of types of receptacles 206, including but not limited to, different sized and/or shaped receptacles, as well as through a variety of different combinations of types of receptacles 206. Similarly, the power puck 108 can be configured to provide receptacles 206 that correspond to a particular area(s) or jurisdiction(s) of use, including, for example, receptacles 206 that comply with domestic and/or foreign standards and/or receptacle configurations. Accordingly, as discussed below, the power puck 108 can be configured to accommodate selective electrical coupling of the power puck 108 to other power cables that may be positioned in, or pass through, an upper layer 172 (FIG. 3) of the housing 104. For example, as shown in FIG. 1 the power puck 108 can include one or more electrical receptacles 206 that can receive a mating adapter or plug 116 of a power cable 114 of a device, fixture, or other electrical receptacle that can be located outside of the housing 104. Additionally, as also discussed below, the power puck 108 can include one or more data receptacles 210 that can be communicatively coupled to one or more data cables positioned in the lower layer 174 of the housing 104, and which can also be selectively communicatively coupled to mating data transmission cables received in the upper layer 172 of the housing 104, and/or can be configured to accommodate such data transmission cables being pulled through the modular floor box assembly 100. Data transmission cables can include a variety of different types of cables and wires that can be used to transmit data or information, including, but not limited to, audio/visual cables, network cables, and media cables, such as, for example, HDMI cable, coaxial cable, optic fiber cable, and twisted pair cables, among other types cables or wires.

Figure 2:
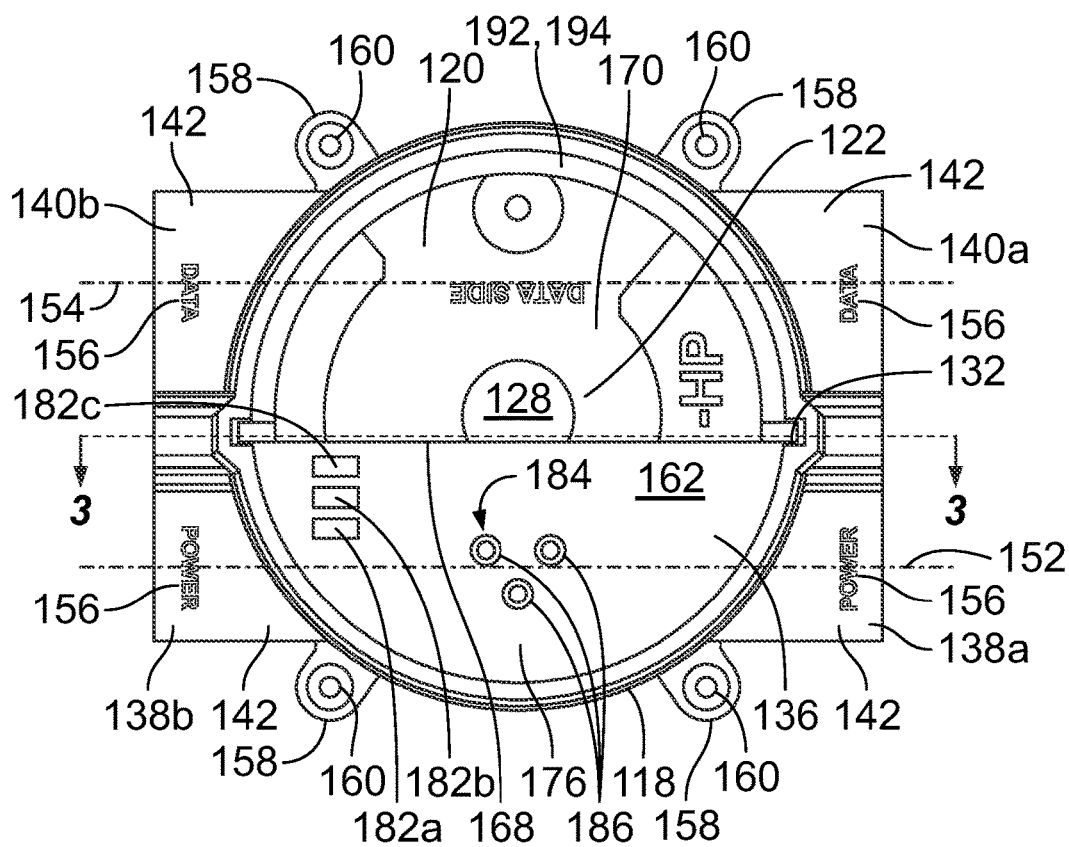
FIG. 2 illustrates a top side view of an exemplary housing for a floor box of a modular floor box assembly according to an embodiment of the present application.
Figure 3:
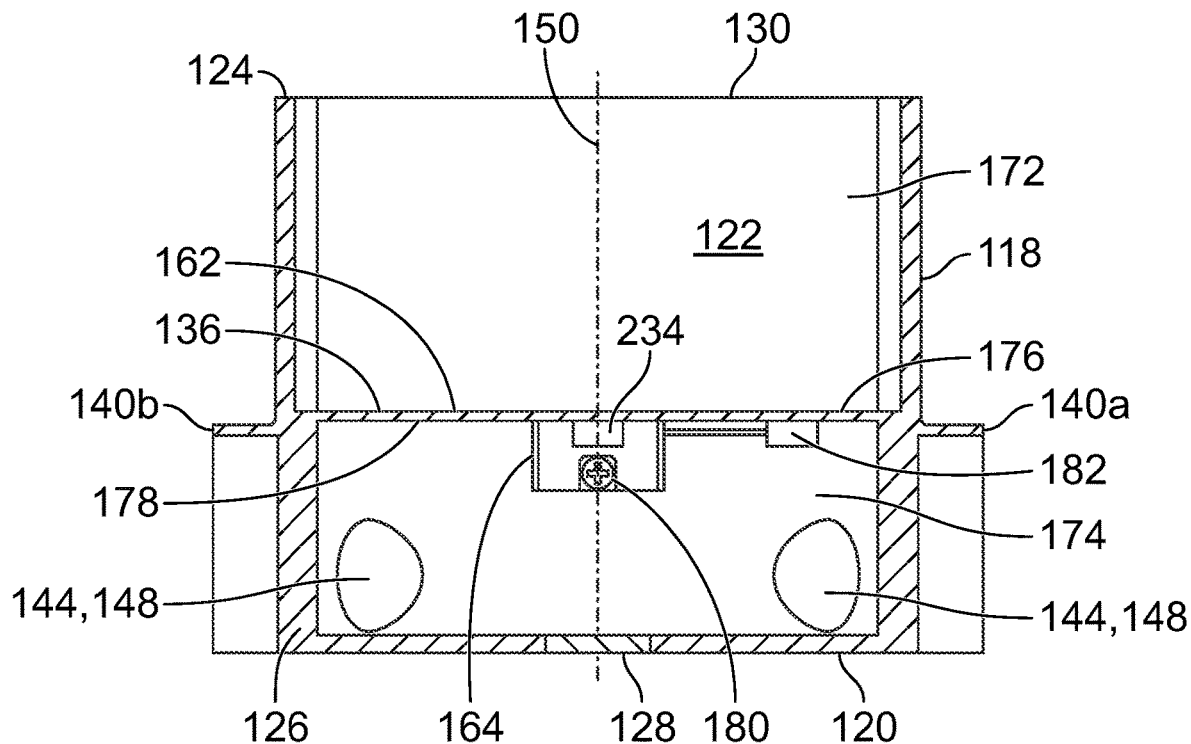
FIG. 3 illustrates a cross sectional view of the housing taken along line A-A of FIG. 2.
Figure 4:
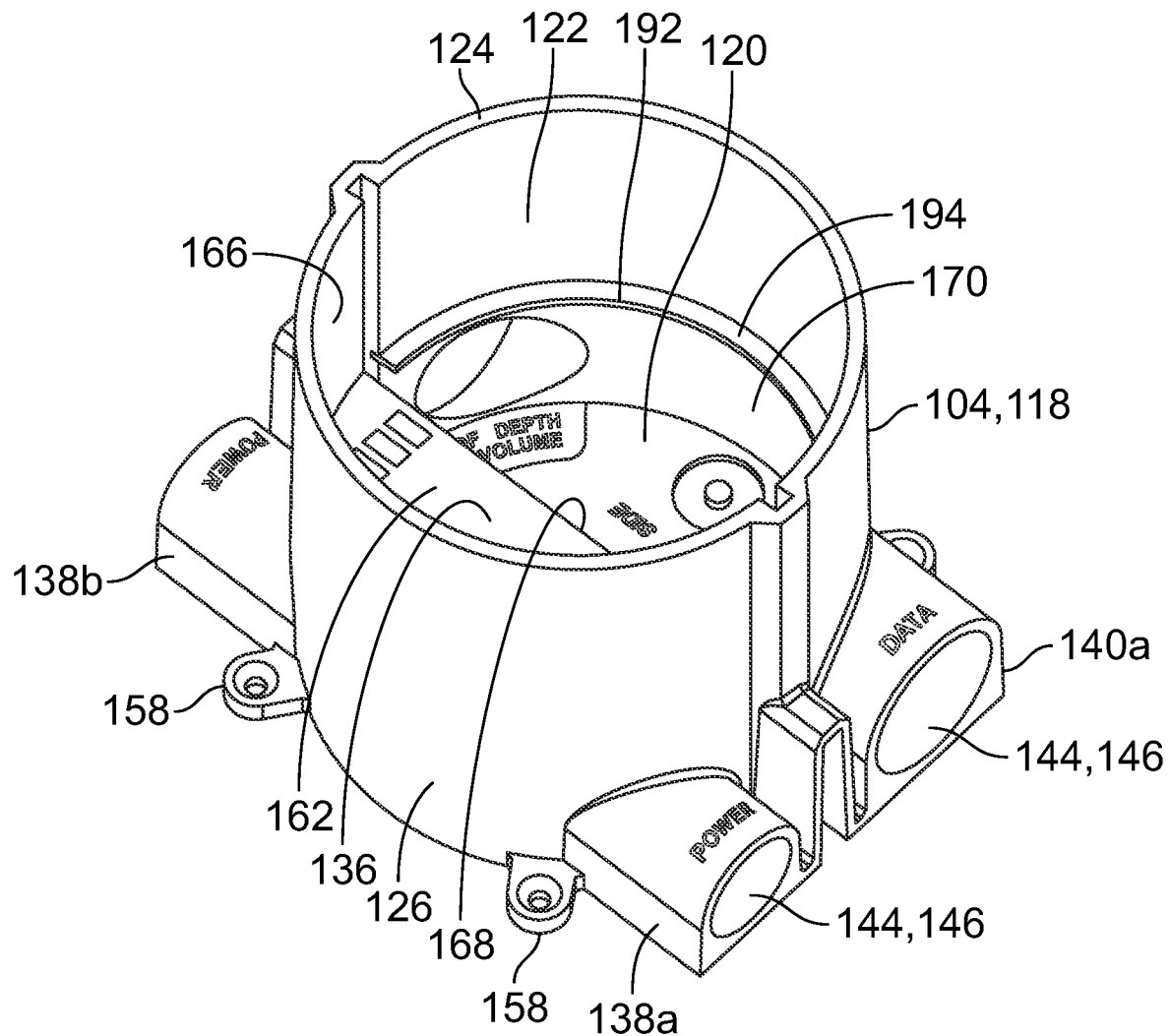
FIG. 4 illustrates a top side perspective view of the housing shown in FIG. 2.

FIGS. 2-4 illustrate an exemplary housing 104 for a floor box 102 of the modular floor box assembly 100 according to an embodiment of the present application. The housing 104 can be constructed from a variety of different materials, including, for example, metallic and non-metallic materials, as well as a combination thereof. For example, according to certain embodiments, the housing 104 can be constructed from one or more of a stamped steel, cast iron, plastics, brass, black coated metal, and polyvinyl chloride (PVC), among other materials. The housing 104 includes a sidewall 118 and a bottom wall 120 that generally define an interior region 122 of the housing 104. The sidewall 118 can include opposing upper and lower portions 124, 126 of the sidewall 118, and can have a variety of shapes and configurations, including, for example, a generally cylindrical configuration, as shown in at least FIGS. 2-4. The bottom wall 120 can be connected to the lower portion 126 of the sidewall 118, and can at least partially extend between opposing portions of the sidewall 118. As shown in at least FIG. 3, according to certain embodiments, the bottom wall 120 can include an orifice 128. Further, the upper portion 124 of the sidewall 118 may generally define an opening 130 of the interior region 122.

The voltage divider 106 can be constructed to provide a barrier between cables within the lower, power layer 174 of the interior region 122 that are used in the transmission of electrical power from cables within the lower, power layer 174 of the interior region 122 that are used in connection with the transmission of data. Further, the voltage divider 106 can be positioned such that, in the event cables associated with the transmission of data are to be pulled through the housing 104, including, for example, pulled through the opening 130 at the upper portion of the interior region 122, the voltage divider 106 can provide both a degree of protection for the data transmission cables and associated devices that are communicatively coupled to the data transmission cables from line voltage, and assist in preventing or minimizing such pulling of the data transmission cables from adversely impacting the power transmission cables and/or the associated hardwired electrical connections of those power transmission cables within the housing 104.

According to the illustrated embodiment, the voltage divider 106 can be constructed or molded from a plurality of different types of metallic and non-metallic materials, including, but not limited to, metal, rubber, plastic, PVC, or ceramic, among other materials. Further, according to certain embodiments, the voltage divider 106 can be an integral piece, or, alternatively, molded to the housing 104 within the interior region 122 of the housing 104 so that the voltage divider 106 may not be removable from the housing 104. Alternatively, the sidewall 118 can include a pair of opposing slots 132 that can accommodate slideable displacement of a portion, of the voltage divider 106, as well as provide support for the inserted voltage divider 106 so as to at least assist in maintaining the voltage divider 106 at a selected position within the housing 104. The slots 132 can extend from the upper portion 124 to the lower portion 126 of the sidewall 118 such that the voltage divider 106 can be at least adjacent to, and may abut, the bottom wall 120 of the housing 104. Opposing edges 134 of the voltage divider 106 can each be inserted into a slot 132 so that the voltage divider 106 can be displaced along the slots 132 within the interior region 122 of the housing 104. According to at least certain embodiments, one or both of the opposing edges 134 of the voltage divider 106 and/or the associated mating slots 132 of the housing 104 can be configured to at least assist in retaining an inserted voltage divider 106 within the slots 132. For example, according to certain embodiments, the opposing edges 134 of the voltage divider 106 can include protrusions, serrations, and/or teeth that can engage an adjacent surface of, or that define, the corresponding slot 132 in manner that can provide a resistance or gripping feature that opposes removal of the inserted voltage divider 106 from the slots 132. Alternatively, or additionally, the inserted voltage divider can be retained in other manners with in the slots 132, such as, for example, via a mechanical fastener, such as, for example, a screw, bolt, or pin, and/or via use of an adhesive. Further, according to certain embodiments, the voltage divider 106 may not be removable from the housing 104 without a power deck 136 (FIG. 3) and the power puck 108 being removed from the interior region 122 of the housing 104.

The housing 104 can also include a first set of fittings or ports 138a, 138b, and a second set of fittings or ports 140a, 140b that extend from, or adjoined to a portion of the lower portion 126 of the sidewall 118. Each fitting 138a, 138b, 140a, 140b can include a fitting wall 142 that generally defines a passageway 144 for the associated fitting 138a, 138b, 140a, 140b that extends through the fitting wall 142 and to the interior region 122 of the housing 104. Thus, the passageway 144 of each fitting 138a, 138b, 140a, 140b can provide a pathway for the ingress/egress of cables into/from/through the housing 104. As seen in at least FIGS. 1, 3 and 4, each passageway 144 has a first opening 146 and an opposing second opening 148, the second opening 148 being adjacent to the interior region 122 of the housing 104 and positioned such that the bottom wall 120 of the housing 104 does not inhibit the ingress/egress of cables into/from the interior region 122 through the passageway 144. The first and second openings 146, 148 may, or may not, have the same size, such as, for example, diameters. Further, according to certain embodiments, at least the first opening 146 can have a size, such as, for example, diameter, that can accommodate insertion of a portion of a conduit into at least a portion of the passageway 144, such as, for example, pipe or tubing containing cables that are being delivered to, or passing from, the modular floor box assembly 100. Additionally, the size of the first and/or second openings 146, 148 of the first set of fittings 138a, 138b, such as, for example, diameter(s), may, or may not, be different than the corresponding size of the first and/or second openings 146, 148 of the second set of fittings 140a, 140b. Thus, for example, as shown in at least FIGS. 1 and 4, in the illustrated embodiment, the first and/or second openings 146, 148 for the first set of fittings 138a, 138b, and the associated fitting wall 142, may be smaller than the corresponding first and/or second openings 146, 148 for the second set of fittings 140a, 140b, and/or the associated fitting wall 142 for the second set of fittings 140a, 140b.

For example, with respect to the first set of fittings 138a, 138b, one or more cables used in the transmission of electrical power can enter the passageway 144 through the first opening 146 of the first fitting 138a, and be delivered via the passageway 144 and through the second opening 148 of the first fitting 138a into the interior region 122 of the housing 104. Additionally, at least some of those same power transmission cables, and/or other power transmission cables, can exit the interior region 122 and/or housing 104 by entering the passageway 144 of the second fitting 138b through the second opening 148 and exit the housing 104 through the first opening 146 of the second fitting 138b. Similarly, with respect to the second set of fittings 140a, 140b, one or more cables used in the transmission of data can enter the passageway 144 of the corresponding first fitting 140a through the first opening 146, and be delivered via the passageway 144 and through the second opening 148 of the first fitting 140a into the interior region 122 of the housing 104. Further, at least some of those same data transmission cables, and/or other data transmission cables, can exit the interior region 122 and/or housing 104 by entering the second opening 148 of the second fitting 140b, and exit the housing 104 through the first opening 146 of the second fitting 140b. While the above example is discussed in terms of cables entering the first fitting 138a, 140a and cables exiting the housing 104 through the associated second fitting 138b, 140b, cables can also enter the housing 104 through the second fitting 138b, 140b, and exit from the housing 104 through the first fitting 138a, 140a.

For one or both of the first and second sets of fittings 138a, 138b, 140a, 140b, the first fitting 138a, 140a can be positioned at a variety of locations relative to the associated second fitting 138b, 140b and/or relative to a central longitudinal axis 150 (FIG. 3) of the housing 104. For example, as seen in at least FIGS. 2-4, according to certain embodiments, the first and second fittings 138a, 138b of the first set of fittings can generally be around 180 degrees apart from each other so as to be on opposing sides of the housing 104, as well as be at generally the same vertical height relative to a central longitudinal axis 150 of the housing 104. Thus, according to such an embodiment, the first and second fittings 138a, 138b of the first set of fittings can be generally aligned with each other along a first fitting axis 152 (FIG. 2) that is generally orthogonal to, and may or may not be offset from, the central longitudinal axis 150 of the housing 104.

With respect to the second set of fittings, the first and second fittings 140a, 140b of the second set of fittings can be positioned and oriented relative to each other in a manner that is similar to the above-discussed relative positions and orientations of the first set of fittings, and, more specifically, the first and second fittings 138a, 138b of the first set of fittings. Thus, for example, the first and second fittings 140a, 140b of the second set of fittings can be generally 180 degrees apart from each other and have similar heights such that the first and second fittings 140a, 140b of the second set of fittings are aligned with each other along a second fitting axis 154 that is generally parallel to the first fitting axis 152. Additionally, as shown in FIG. 2, according to certain embodiments, the first and second fitting axes 152, 154 can be offset from the central longitudinal axis 150 such that the first and second fitting axes 152, 154 are on opposing sides of the central longitudinal axis 150. Thus, as seen in at least FIG. 2, according to certain embodiments, the first fittings 138a, 140a of the first and second set of fittings may be generally adjacent, or otherwise in relative close proximity to each other, and the second fittings 138b, 140b of the first and second set of fittings may be generally adjacent, or otherwise in relative close proximity to each other.

As also seen in at least FIG. 2, according to certain embodiments, at least some, if not all, of the fitting walls 142 can include indicia 156 that can assist with identification of whether a particular fitting 138a, 138b, 140a, 140b is intended for use with cables for particular types of transmissions, such as, for example, power transmission or data transmission. Moreover, such indicia 156 can provide an indication of the particular area within the interior region 122 that that is to receive electrical transmission cables, and the area(s) in the interior region 122 that is to receive the data transmission cables. In the illustrated embodiment, some indicia 156 includes the word "POWER" in association with the first and second fittings 138a, 138b of the first set of fittings, and other indicia 156 includes the word "DATA" in association with the first and second fittings 140a, 140b of the second set of fittings. However, a variety of other words, letters, phrases, and/or symbols may be utilized for the indicia 156.

As also shown in at least FIG. 2, the housing 104 can also include a plurality of anchors or feet 158 that can extend generally outwardly from the lower portion 126 of the sidewall 118 of the housing 104. As shown, according to the illustrated embodiment, the anchors 158 can outwardly extend in different directions. Additionally, the anchors 158 can include a through-hole or orifice 160 that is configured to accommodate passage of a mechanical fastener, such as, for example, a bolt, screw, or pin, among other fasteners, through the anchor 158.

Figure 16:
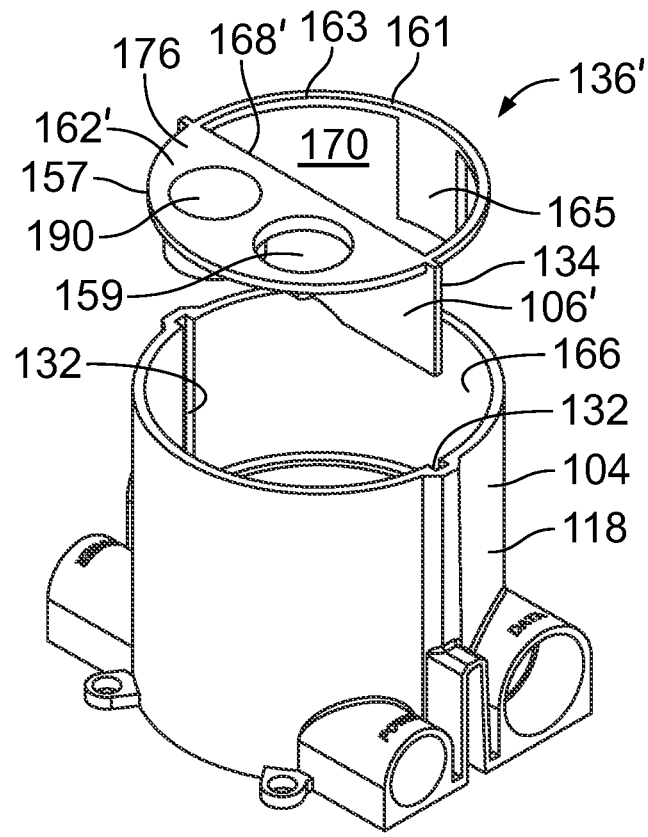
FIG. 16 illustrates an exploded view of a floor box and a power deck having an integral divider wall for a modular floor box assembly according to an embodiment of the present application.

The housing 104 can also include a power deck 136 that is positioned within the interior region 122 of housing 104. According to certain embodiments, the power deck 136 can include a deck housing 162 and a power terminal block 164. As seen in FIG. 16, according to certain embodiments, the deck housing 162' can include an aperture 159 sized to receive the power terminal block 164, including, for example, a female receptor of the power terminal block 164. Further, the deck housing 162 can be constructed from the same material as the sidewall 118.

According to certain embodiments, the sidewall 118, bottom wall 120, fitting walls 142, and deck housing 162 can form, or be part of, a monolithic structure. Alternatively, the power deck 136 can be selectively removable from, or displaceable within, the housing 104. For example, according to certain embodiments, the power deck 136 includes one or more tabs that are matingly received in the slots 132 of the housing 104 that can guide, as well as at least partially secure, a placement or position of the power deck 136 in the housing 104. Alternatively, according to other embodiments, the power deck 136 can include tabs that are received in the slots 132, and which can accommodate pivot displacement of the power deck so as to accommodate access to the power deck 136 and/or the lower, power layer 176 beneath the deck housing 162. Additionally, one or more supports may inwardly protrude from the sidewall 118 of the housing 104 beneath the deck housing 162 that can provide support to the deck housing 162 and/or onto which the deck housing 162 can sit. According to such embodiments, the power deck 162 can, for example, be removed from the interior region 122 of the housing 104, or otherwise displaced relative to at least the housing 104, while power transmission cables are hardwired to the power terminal block 164. Further, according to certain embodiments, the power deck 136, which may, or may not, be removable, can also be further secured within the interior region 122 by a mechanical fastener, such as, for example, a screw, bolt, or pin, that can secure the position of the power deck 136 within the housing 104.

Additionally, according to other embodiments, the power deck 136' and voltage divider 106' can form an integral, monolithic structure, as seen, for example, by the power deck 136' shown in FIG. 16. Aside from being part of a monolithic structure, the deck housing 136' and voltage divider 106' may, or may not, have configurations similar to, or the same as. the deck housing 136 and voltage divider 106, respectively, that are discussed herein with respect to other embodiments. Moreover, according to certain embodiments, the opposing edges 134 of the voltage divider 106' can be inserted into mating slots 132 of the housing 104, as previously discussed. Further, as also previously discussed, the voltage divider 106' can be retained within the slots 132, such as, for example, via engagement of protrusions, serrations, and/or teeth along the opposing edges 134 of the voltage divider 106' with an adjacent surface(s) of the slots 132, use of a mechanical fastener(s), and/or via an adhesive. Similar to other embodiments, one or more supports may inwardly protrude from the sidewall 118 of the housing 104 beneath the deck housing 162' shown in FIG. 16 that can provide support to the deck housing 162' and/or onto which the deck housing 162' can sit.

The vertical location of the power deck 136 within the housing 104, and moreover, along the central longitudinal axis 150 of the housing 104, can be based on a variety of criteria, including, for example, whether the associated power puck 108, when assembled to the modular floor box assembly 100, is to be downwardly recessed from, or flush with, the upper portion 124 of the sidewall 118 of the housing 104.

Figure 5:
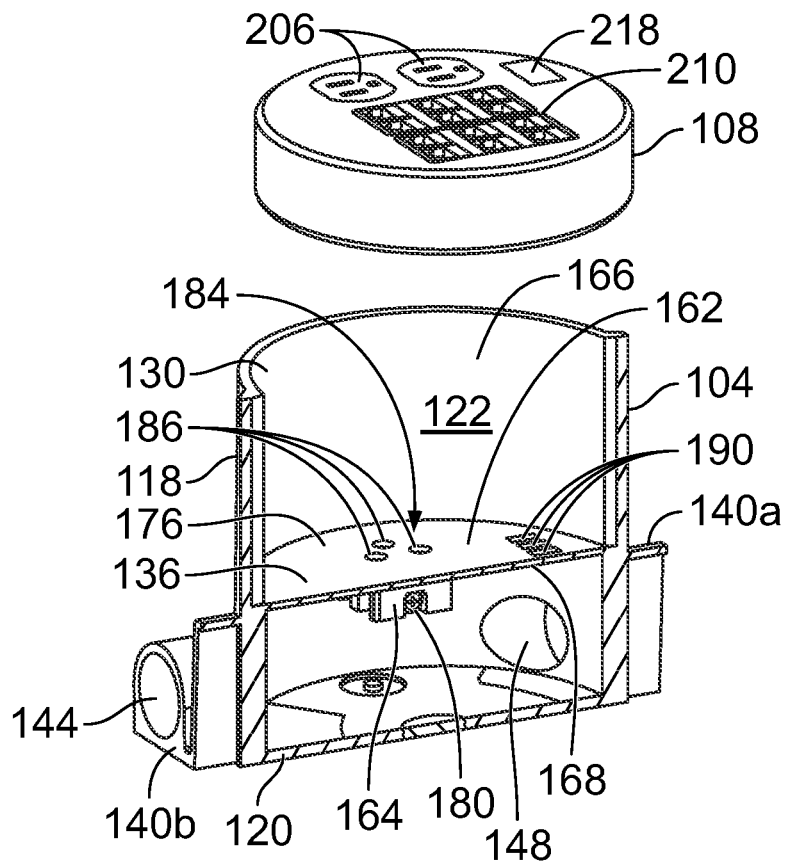
FIG. 5 illustrates a top side perspective view of a cross section of the housing and a perspective view of a power puck in a dissembled position according to an embodiment of the present application.

As seen in at least FIGS. 4 and 5, according to certain embodiments, the deck housing 162 can inwardly extend from an inner surface 166 of the sidewall 118 to an outer edge 168 of the deck housing 162. At least a portion of the outer edge 168 can be separated from an opposing portion of the inner surface 166 of the sidewall 118 by an aperture 170 such that the outer edge 168, and thus a portion of the deck housing 162, is detached from the sidewall 118. For example, according to certain embodiments, the deck housing 162 has a half circle shape in which the outer edge 168 of the deck housing 162 is generally parallel to the first and second fitting axes 152, 154, and generally orthogonal to the central longitudinal axis 150 of the housing 104. Additionally, the outer edge 168 of the deck housing 162 may, or may not, intersect the central longitudinal axis 150 of the housing 104. Further, according to an illustrated embodiment, the outer edge 168 of the deck housing 162 can be positioned such that the aperture 170 is at least above a portion of the second fitting axis 154. The aperture 170 can provide an area in which data transmission cables from the first and/or second fittings 140a, 140b of the second set of fittings can be positioned to be operably coupled to at least a portion of the power puck 108, and/or a location that can accommodate data transmission cables being pulled through the modular floor box assembly 100, such as data transmission cables that extend from at least the first and/or second fittings 140a, 140b and the opening 130 of the interior region 122 of the housing 104.

As seen in FIG. 16, according to certain embodiments, power deck 136' can include the deck housing 162' and a rim portion 163. The rim portion 163 can extend from opposing ends of an outer edge 168' of the deck housing 162' and generally have an arc shape. Moreover, the rim portion 163 and an outer periphery 157 of the deck housing 162' can be shaped to generally conform to the shape of the portions of the inner surface inner surface 166 of the sidewall 118 of the housing 104 that will be adjacent to the deck housing 162' and the rim portion 163 when the power deck 136' is installed in the housing 104. Thus, according to certain embodiments, the power deck 136' can have a generally a circular outer shape. Further, the aperture 170 can be positioned between, or generally defined by, the outer edge 168' of the deck housing 162' and the rim portion 163. Additionally, according to certain embodiments, an upper surface 161 of the rim portion 163 may, or may not, be generally coplanar to a corresponding upper surface 176 of the deck housing 162'.

The deck housing 162', and thus at least a portion of the power deck 136', can be supported in the housing 104 in a manner similar to that discussed above with respect to the deck housing 162 shown in at least FIGS. 4 and 5. Additionally, the voltage divider 106' can also provide support for the power deck 136'. Additionally, or alternatively, the power deck 136' can include one or more support arms 165 that extend generally in a down direction from the rim portion 163 to the bottom wall 120 of the housing 104 that can also provide support for the power deck 136'. For example, the support arm 165 can downwardly extend from the rim portion 163 in a direction that is generally parallel to the direction that the voltage divider 106' downwardly extends from the deck housing 162' and/or the rim portion 163. Additionally, in the illustrated embodiment, the support arm 165 is positioned such that, when the power deck 136' is installed in the housing 104, the support arm 165 is generally adjacent to, if not abuts, the inner surface 166 of the sidewall 118 of the housing 104. Accordingly, the support arm 165 can have a shape that generally conforms to the shape of the adjacent portion of the inner surface 166 of the sidewall 118 of the housing 104, such, as, for example, a curved cross-sectional shape. Moreover, the support arm 165 can be positioned to minimize, if not prevent, the support arm 165 from interfering with the ingress/egress of cables through the aperture 170.

As seen in FIG. 3, the deck housing 162 can be generally parallel to the bottom wall 120 of the housing 104, and perpendicular to the central longitudinal axis 150 of the housing 104. Further, the deck housing 162 can provide a divider for the upper layer 172 and the lower layer 174 of the interior region 122 of the housing 104. As previously discussed, the lower layer 174, which can also be referred to as a power layer, can be configured to house the cable(s) that is/are received into the interior region 122 from any of the first and second sets of fittings 138a, 138b, 140a, 140b. Additionally, as also previously discussed, the voltage divider 106 can be positioned to generally extend between, or from, the deck housing 162 and the bottom wall 120 of the housing 104, as well as be positioned to at least separate the power transmission cables in the interior region 122 that are passing through the first and/or second fittings 138a, 138b of the first set of fittings, from the data transmission cables in the interior region 122 that are passing through the first and/or second fittings 140a, 140b of the second set of fittings.

The deck housing 162 can include an upper surface 176 and a lower surface 178. The power terminal block 164 can be coupled to the lower surface 178 of the deck housing 162 in a variety of manners. For example, according to certain embodiments, the power terminal block 164 and the deck housing 162 can be part of a unitary, monolithic structure. Alternatively, the power terminal block 164 can be secured to the lower surface 178 of the deck housing 162 by one or more mechanical connections, mechanical fasteners, rivets, spot welding, brazing, soldering, and/or an adhesive, among other manners of attachment.

The power terminal block 164 can include a plurality of terminals 180 that can each be connected to a power transmission cable. For example, according to certain embodiments, the power terminal block 164 can include one or more terminals 180, including, for example, screw terminals and/or quick connect terminals, for hardwiring the power terminal block 164 to each of a load line(s), neutral line(s), and ground. Such hardwired connections can, in at least some situations, be performed by an electrician or other electrically trained technician, among other individuals. Additionally, the power terminal block 164 can be electrically coupled to one or more status indicators 182, which can provide a visual indication of the status of one or more electrical connections of the power terminal block 164. For example, according to certain embodiments, the status indicator 182 can provide a separate visual indication of the status of an electrical connection, if any, of the power terminal block 164 to each of a load line, a neutral line, and ground, and/or an indication as to whether electrical power is being received by the power terminal block 164. According to the illustrated embodiment, the status indicator 182 is an array of lights that comprises a first light 182a that provides a status indication with respect to a connection and/or electrical transmission along the load line(s), a second light 182b that provides a status indication with respect to a connection and/or electrical transmission along the neutral line(s), and a third light 182c that provides an indication as to whether the power terminal block 164 is connected to ground. A variety of different types of electrically powered lights can be used for the status indicators 182. Further, the status indicators 182 can be positioned at a variety of locations along the deck housing 162, including, for example, positioned in one or more openings 190 in the deck housing 162. Further, the status indicators 182 are positioned to accommodate visual detection when being viewed at least from a position above the top portion of the sidewall 118 of the housing 104, and/or when observing the upper surface 176 of the deck housing 162.

The deck housing 162 can further include a deck receptor 184 that is electrically coupled to the power terminal block 164. The deck receptor 184 is further configured for selective electrical coupling to the power puck 108 such that electrical power can be delivered from the power terminal block 164 to the power puck 108 via the power puck 108 being electrically coupled to the deck receptor 184. Further, the deck receptor 184 can be a female electrical receptor or socket that is safe to the touch, otherwise referred to as touch safe. For example, according to the illustrated embodiment, the deck receptor 184 comprises a female receptor or socket having a plurality of openings 186 that extend through the upper surface 176 of the deck housing 162. The plurality of openings 186 can accommodate a plug-in connection in which the mating pins 189 of a male receptacle 188 (FIG. 8) of the power puck 108 passes through, or plug into, the deck housing 162 so as to become electrically coupled to the corresponding electrical contacts of the power terminal block 164. According to such an embodiment, electrical contact between the electrical conductors of the deck receptor 184 and mating pins 189 of the male receptacle 188 of the power puck 108 occurs below at least the upper surface 176 of the deck housing 162, and/or beneath the deck housing 162, such that the deck housing 162 and the limited size of the openings 186 of the deck receptor 184 can shield a user from at least incidental, and potentially dangerous, direct contact with the electricity, and thus can protect the user from possible electrocution. Moreover, by being a touch safe, plug-in connection, the deck receptor 184 can accommodate relatively safe and simple operable installation or assembly of the power puck 108 to the floor box 102 by a novice user of the modular floor box assembly 100, including the novice user being able to electrically couple the power puck 108 to the electrical power delivered to the hardwired power terminal block 164 without necessitating disconnect or interrupting the supply of power that is being delivered to the power terminal block 164. Similarly, such a configuration can also accommodate, if needed, relatively safe and simple removal of the power puck 108 from the floor box 102, including a hot-swap in which a power puck 108 is removed from the modular floor box assembly 100 while electrical power is still being delivered to the power terminal block 164, as well as subsequent re-installation or replacement of the power puck 108 in the floor box 102, again without interruption in the delivery of electrical power to the to the hardwired power terminal block 164.

A variety of different types of touch safe plug-in connection configurations can be utilized for the female deck receptor 184 of the power puck 108 and the mating male receptacle 188 of the power puck 108. For example, the female deck receptor 184 and mating male receptacle 188 can utilize a blade and fork connection configuration, pin and sleeve connection configuration, a twisting lock detail, or a cable having a male receptacle in the form of a plug that can be electrically coupled to the female deck receptor 184 in only one way or manner. Alternatively, according to other embodiments, power can be transmitted across the power deck 136 to the power puck 108 via induction power transmission, or via use of conductive polymers.

As seen in at least FIG. 4, according to the illustrated embodiment, a portion of the inner surface 166 of the sidewall 118 of the housing 104 that is not directly connected to the deck housing 162 can include a ledge or rim 192 that can, along with the deck housing 162, provide support for the power puck 108. Moreover, as shown, the rim 192 can inwardly extend from a portion of the sidewall 118 that is positioned on a side of the aperture 170 that opposes the deck housing 162. Thus, the rim 192 and deck housing 162 can generally be positioned on opposing, or different, sides of the aperture 170. An upper surface 194 of the rim 192 can be generally coplanar with the upper surface 176 of the deck housing 162 such that the power puck 108 can be supported in a generally level position by the deck housing 162 and the rim 192. Further, according to certain embodiments, the upper surfaces 176, 194 of the deck housing 162 and rim 192 can be generally parallel to the bottom wall 120 of the housing 104 and/or generally perpendicular to the central longitudinal axis of the housing 104.

Figure 7:
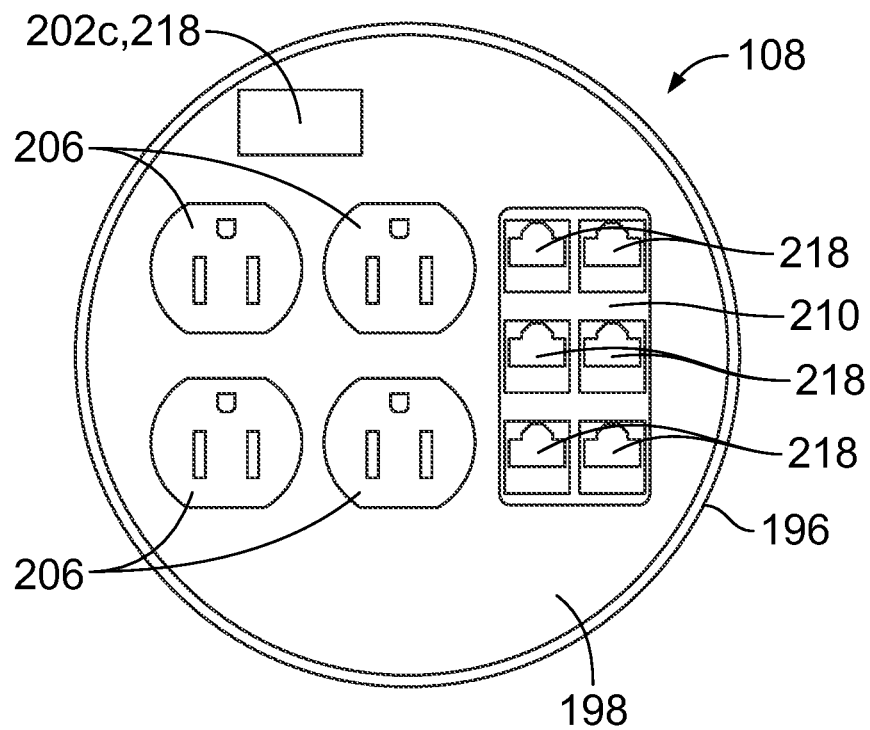
FIGS. 7, 8, and 9 illustrate top, side, and bottom views, respectively, of an exemplary power puck according to an embodiment of the present application.
Figure 8:
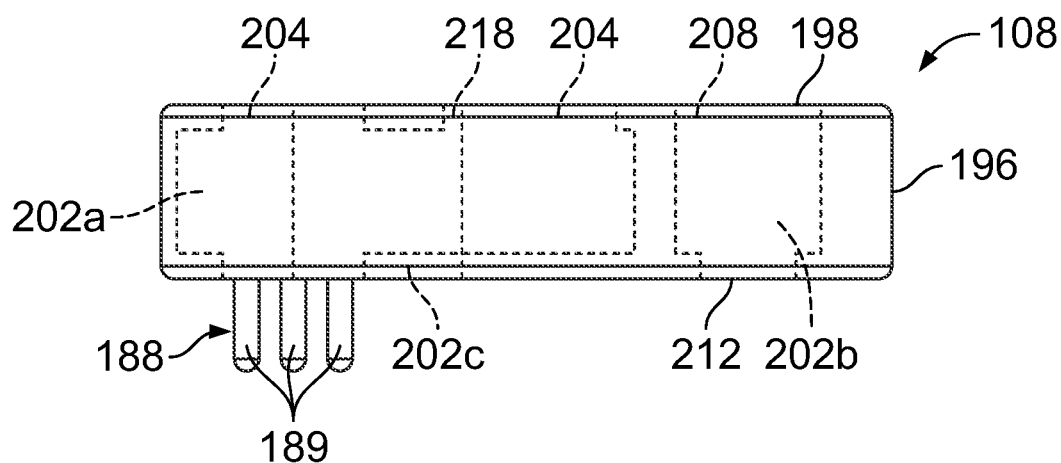
Figure 9:
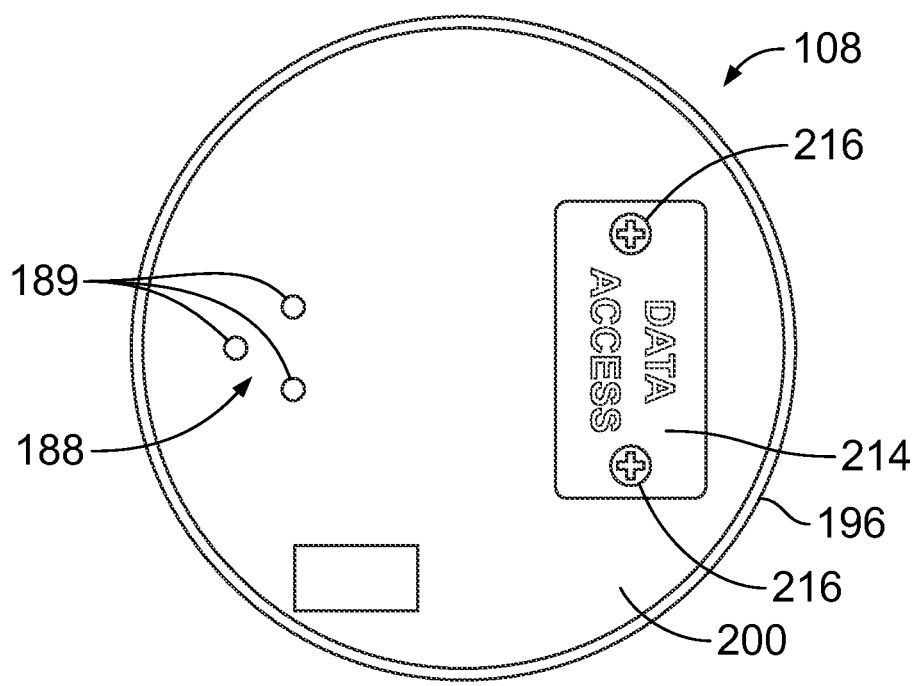

Referencing FIGS. 7-9, the power puck 108 includes an outer wall 196 that extends between opposing top and bottom walls 198, 200 of the power puck 108. The distance that the outer wall 196 extends between the top and bottom walls 198, 200 can be based on a variety of criteria, including, for example, whether the power puck 108 is to be positioned at a recessed position in the interior region 122 of the housing 104 relative to at least a portion of the upper portion 124 of the sidewall 118, or if the power puck 108 is to be generally flush with the upper portion 124 of the sidewall 118.

The outer, top, and bottom walls 196, 198, 200 of the power puck 108 can be constructed from a variety of different materials, including, for example, generally electrically non-conductive or insulative materials, such as, but not limited to, rubber, plastic, PVC, ceramics, and/or a combination thereof, among other materials. Further, the outer, top, and/or bottom walls 196, 198, 200 can generally define at least portions of one or more interior region(s) 202a, 202b, 202c of the power puck 108 that may, or may not, be at least partially hollow.

The outer wall 196 of the power puck 108 can have a variety of shapes and sizes. According to the illustrated embodiment, the outer wall 196 has a shape and size that can accommodate the power puck 108 being positioned in the upper layer 172 of the interior region 122 of the housing 104 at least at a position at which at least a portion of the bottom wall 200 of the power puck 108 is positioned against the upper surfaces 176, 194 of the deck housing 162 and the rim 192. According to certain embodiments, the outer wall 196 has, for example, a generally cylindrical configuration with a cross sectional diameter that is generally similar, if not smaller, than a corresponding diameter for the inner surface 166 of the sidewall 118 of the housing 104.

The top wall 198 of the power puck 108 can include one or more socket openings 204 configured for placement of one or more corresponding electrical receptacles 206. The one or more socket openings 204 can be positioned such that, when the power puck 108 is assembled to the floor box 102, and thus the power puck 108 is electrically coupled to the power terminal block 164, at least a portion of the socket openings 204 overlap at least a portion of the below deck housing 162 and the portion of the lower layer 174 of the interior region 122 that contains the power transmission cables. Further, the one or more socket openings 204 can be sized to house a single electrical receptacle 206 or a plurality of electrical receptacles 206. Similar to the female deck receptor 184, the more socket openings 204 can be configured for a variety of different types of electrical connections with a mating the power plug 116 of a power cable 114 of an external device, including, but not limited to, accommodated a mating connection involving a blade and fork connection, pin and sleeve connection, a twisting lock detail, or a connection with a cable having a male receptacle in the form of a plug that can be connected to a mating female electrical receptacle 206 in only one way or manner.

Additionally, the one or more socket openings 204 can be in fluid communication with a first interior region 202a of the power puck 108 that can house at least a portion of the electrical receptacles 206. The first interior region 202a can also be positioned to accommodate connectors or cables that electrically couple the electrical receptacles 206 to the male receptacle 188 of the power puck 108 such that, when the power puck 108 is assembled in the floor box 102, electrical power can be delivered from the power terminal block 164 to the electrical receptacles 206.

While, according to certain embodiments, the power puck 108 may only include one or more electrical receptacles 206, according to other embodiments, the top wall 198 of the power puck 108 can also include one or more data openings 208 configured for placement of, or accommodate access to, one or more corresponding data receptacles 210 of the power puck 108. The one or more data openings 208 can be positioned such that, when the power puck 108 is assembled to the floor box 102, and thus the power puck 108 is electrically coupled to the power terminal block 164, at least a portion of the data openings 208 overlap at least a portion of the aperture 170 between the deck housing 162 and the rim 192, as well as overlap at least a portion of the lower layer 174 of the housing 104 that contains the data transmission cables. According to the illustrated embodiment, at least a portion of the data receptacles 210 can be positioned within a second interior region 202b of the power puck 108 that is in fluid communication with the one or more data openings 208. Further, the bottom wall 200 of the power puck 108 can include an access port 212 that can be in fluid communication with the second interior region 202b and/or the data openings 208. The access port 212 can provide a passageway for data transmission cables that enter and/or pass from the floor box 102 via the second set of fittings 140a, 140b to be coupled to the data receptacles 210. Additionally, as shown in FIG. 9, according to certain embodiments, a removable cover 214 can be secured to the bottom wall 200 to prevent the ingress/egress of cables or materials through the access port 212. As seen, the cover 214 can be selectively, and removably, secured to the power puck 108 via one or more mechanical fasteners 216, such as, for example, screws, that may threadingly securely engage the power puck 108.

The one or more data openings 208 can be configured to accommodate one or more types of data receptacles 184. As previously mentioned, the data receptacles 210 can be configured to be communicatively coupled to data transmission cables that may enter into the interior region 122 of the housing 104 via one or both of the first and second fittings 140a, 140b of the second set of fittings, and which may be pulled into the data openings 208 through the aperture 170. The data receptacles 210 can be configured for a variety of different types of connections to data transmission cables, and moreover, to the adapters or connectors of such data transmission cables, including traditional or proprietary adapter connections, as well as combinations thereof. Additionally, such data receptacles 210 can be configured to be coupled to data transmission cables associated with a variety of different types of devices, including, for example, devices that can utilize two-wire bus, fiber optic, wireless, universal serial bus, or analog communication; devices that utilize all digital language forms for any and all digital communication devices; devices that utilize analog signals; HVAC controls; temperature and measurement controls; water detection and drivers to shut off water supply; protection and control circuits; room automation; occupant detection; and, security monitoring communication, including at least video and audio, as well as infrared passive and active monitoring; and UHF or sonic detection devices.

As seen in at least FIGS. 7 and 9, the power puck 108 can also include a viewing window 218 that passes through the power puck 108, including through the top and bottom walls 198, 200 of the power puck 108 so as to accommodate visual access to the status indicators 182a, 182b, 182c (collectively status indicator 182) of the power deck 136. For example, according to certain embodiments, the viewing window 218 can extend between, and through, both the top wall 198 and bottom wall 200, respectively, of the power puck 108, and thus provide a third interior region 202c in the power puck 108. According to the illustrated embodiment, the viewing window 218 is positioned such that, at least when the male receptacle 188 of the power puck 108 is electrically coupled to the deck receptor 184, the viewing window 218 is positioned at least over at least a portion of the status indicators 182 and/or positioned to provide visual access to a visual representation of the status indicators 182. Further, according to certain embodiments, the viewing window 218 can include a transparent or semi-transparent cover that can accommodate visual access to the status indicators 182, while also providing a shield against debris entering, via the viewing window 218, into, or through, the power puck 108.

Figure 10:
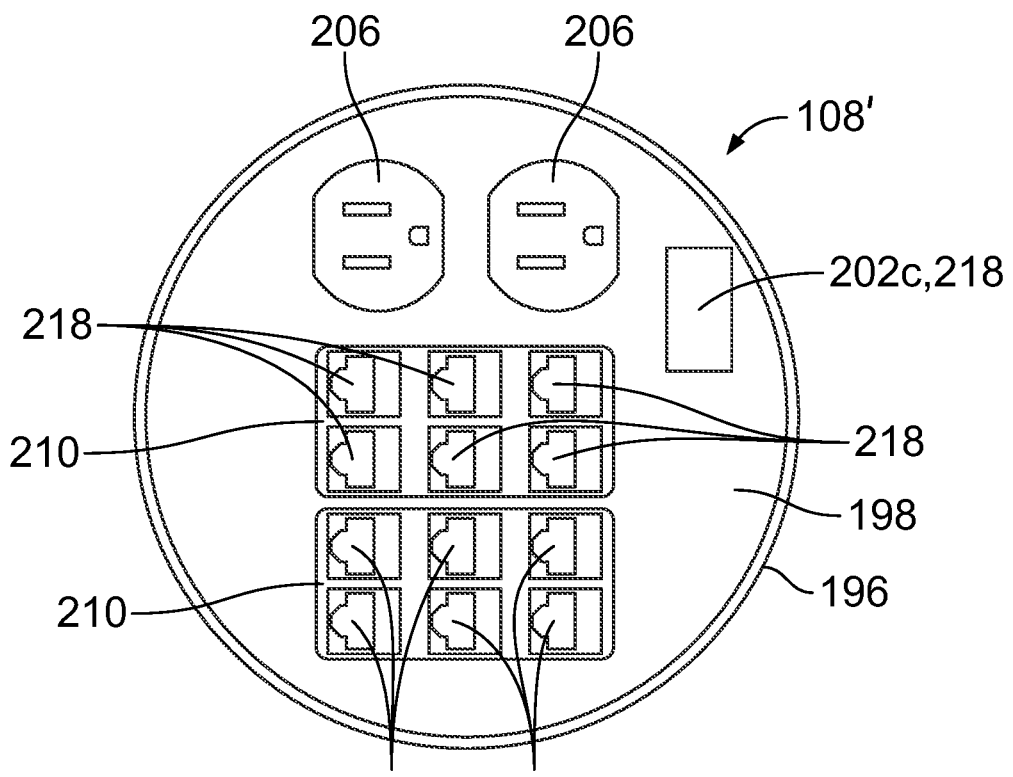
FIGS. 10, 11, and 12 illustrate exemplary alternative configurations for power pucks according to embodiments of the present application.
Figure 11:
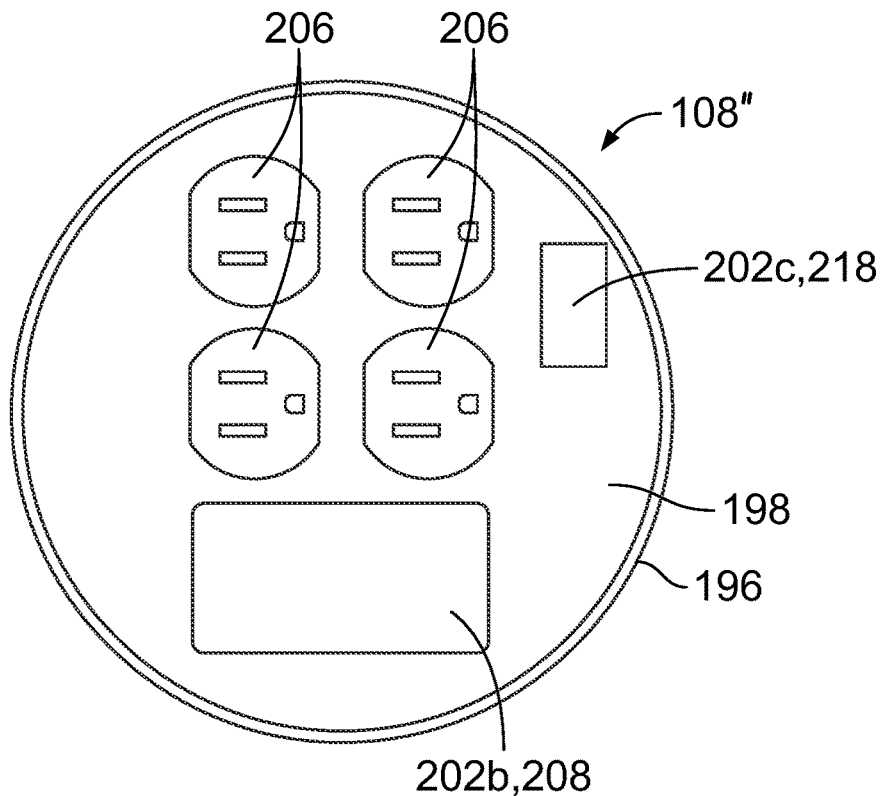

As indicated by at least FIGS. 7, 10, and 11, power pucks 108, 108', 108" can have a variety of configurations with respect to at least the number of socket openings 204 and/or data openings 208, as well as the number of associated electrical receptacles 206 and/or data receptacles 210. For example, while FIGS. 7 and 11 illustrate embodiments of power pucks 108, 108" having four socket openings 204 and four associated electrical receptacles 206, FIG. 10 illustrates another embodiment in which the power puck 108' includes two socket openings 204 and two associated electrical receptacles 206. Further, while FIG. 7 illustrates a power puck 108 having a single data opening 208 that houses a data receptacle 210 having six data connectors 218, the power puck 108 shown in FIG. 10 has two data openings 208, each of which includes a data receptacle 210 having six data connectors 218, thereby providing twelve data connectors 218. Alternatively, FIG. 11 illustrates an embodiment in which, rather than having a data receptacle 210, the power puck 108 is configured for data transmission cables to be pulled through the data opening 208 and associated second interior region 202b. According to such a configuration, the data opening 208 and associated second interior region 202b can include corner protection for the protection of the sheathing on the data transmission cables.

While the power puck 108 shown in FIGS. 7, 10, and 11 each having similar types of electrical receptacles, and FIGS. 7 and 10 illustrate similar types of data receptacles 210, according to other embodiments, the power pucks 108, 108', 108" can include one or more electrical receptacles 206 that are configured to receive a type of connector, that is different than, or has a different configuration, than the type or configuration of connector that another electrical receptacle 206 of the power puck 108, 108', 108" is configured to receive. Similarly, the power puck 108, 108', 108" can also include a mixture of different types, or configurations, of data receptacles 210.

Figure 12:
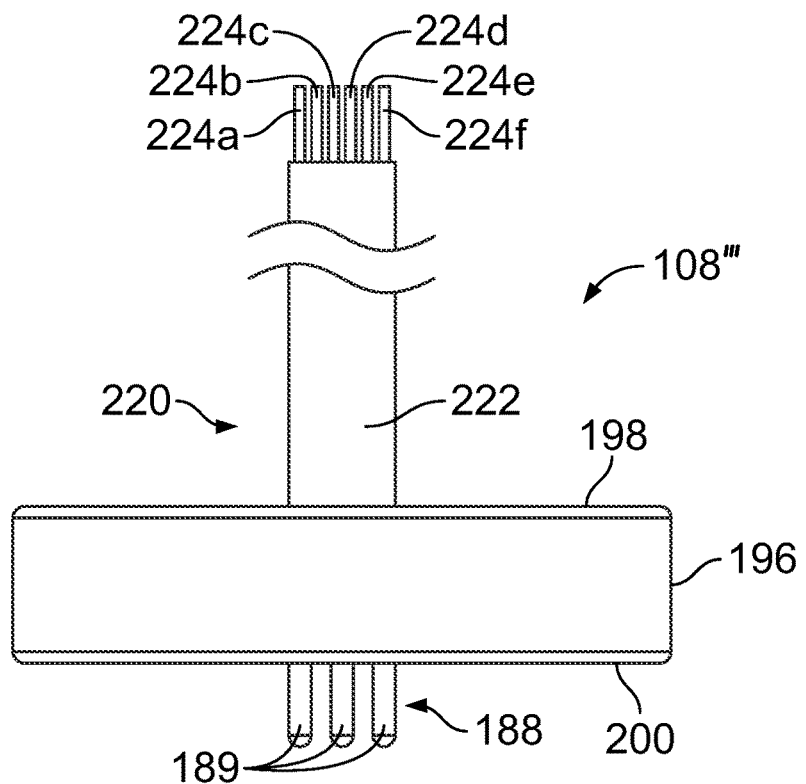

FIG. 12 illustrates another exemplary power puck 108''' according to an embodiment of the subject application. According to the depicted embodiment, in lieu of, or, alternatively, in addition to having socket openings 204 and/or data openings 208, and associated electrical and/or data receptacles 210, the power puck 108''' can have a power whip 220 comprising a cable having an outer sheath 222 that houses a plurality of wires 224a-f that can be used in connection with delivering at least electrical power received by the power puck 108''' from the power deck 136. Such a power whip 220 can be used in numerous applications, including, but not limited to, in connection with the delivery of electrical power for use with office cubicles and furniture. Additionally, according to certain devices, in addition to providing wires used in the transmission of electrical power, the power whip 220, or another similar whip, can also include one or more data transmission cables that can include, or are in operable communication with, cable transmission cables that pass through one or more of the first and second fittings 140a, 140b of the second set of fittings.

Figure 17:
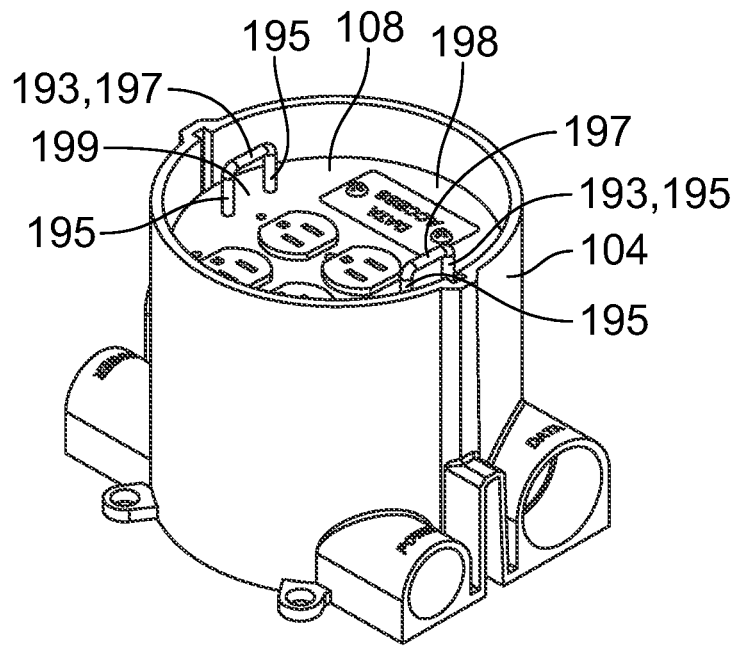
FIG. 17 illustrates a perspective view of a modular floor box assembly that includes a power puck having engagement bodies according to an embodiment of the present application.

Referencing FIG. 17, according to certain embodiments, the power puck 108 can further include one or more engagement bodies 198 that can improve the ease with which the power puck 108 can be positioned within, and/or removed from, the housing 104. For example, according to certain embodiments, the engagement body 198 upwardly project from the top wall 198 of the power puck 108 so as to provide an area that can be grasped by a user and/or a tool. For example, according to certain embodiments, the engagement body 1998 can comprise one or more handles, at least a portion of which is upwardly projected, or offset, from the top wall 198 of the power puck 108 so that the engagement body 198 is accessible to a user or installer at least when the power puck 108 is, or is being brought into, electrical contact with the power terminal block 164. Further, according to certain embodiments, the engagement body 198 may comprise a pair of legs 195 that are adjoined together by a cross bar 197 that is positioned above the top wall 198 of the power puck 108. Optionally, such a configuration can generally define an opening 199 between the legs 195, crossbar 197, and top wall 198 that can accommodate placement of at least a portion of a digit of an installer. Further, according to certain embodiments, the engagement body 198 may be retractable such that at least a portion of the engagement body 198 can, when not being used, be positioned beneath the top wall 198 of the power puck 108. Alternatively, the engagement body 198 can be pivotally connected to the power puck 108 so as to, when not in use, minimize potential interference by the engagement body 198 with at least plugs or connectors that can be electrically coupled to the power puck 108. Alternatively, according to other embodiments, the one or more engagement bodies 198 can comprise one or more recesses or cavities that may extend through, and beneath, at least a portion of the top wall 198 of the power puck 108. Such recesses or cavities can be sized to accommodate placement of at least a portion of a digit of a user beneath the top wall 198 of the power puck 108, and thereby provide a location for a user to engage the power puck 108 when installing the power puck 108 into the housing 104, as well as a location where the user can provide a pulling force beneath, or to a backside of, the top wall 198 so as to be able to pull the power puck 108 away from the housing 104.

Figure 13:
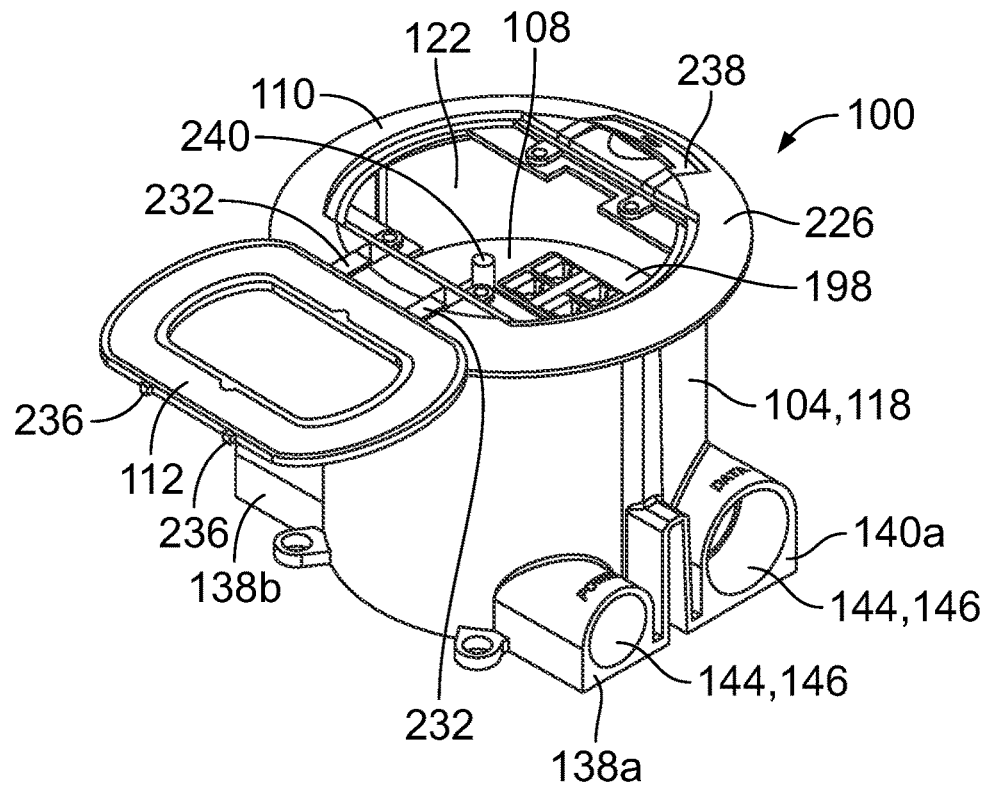
FIGS. 13 and 14 illustrate a side perspective view and a top view, respectively, of a modular floor box assembly according to an embodiment of the present application.
Figure 14:
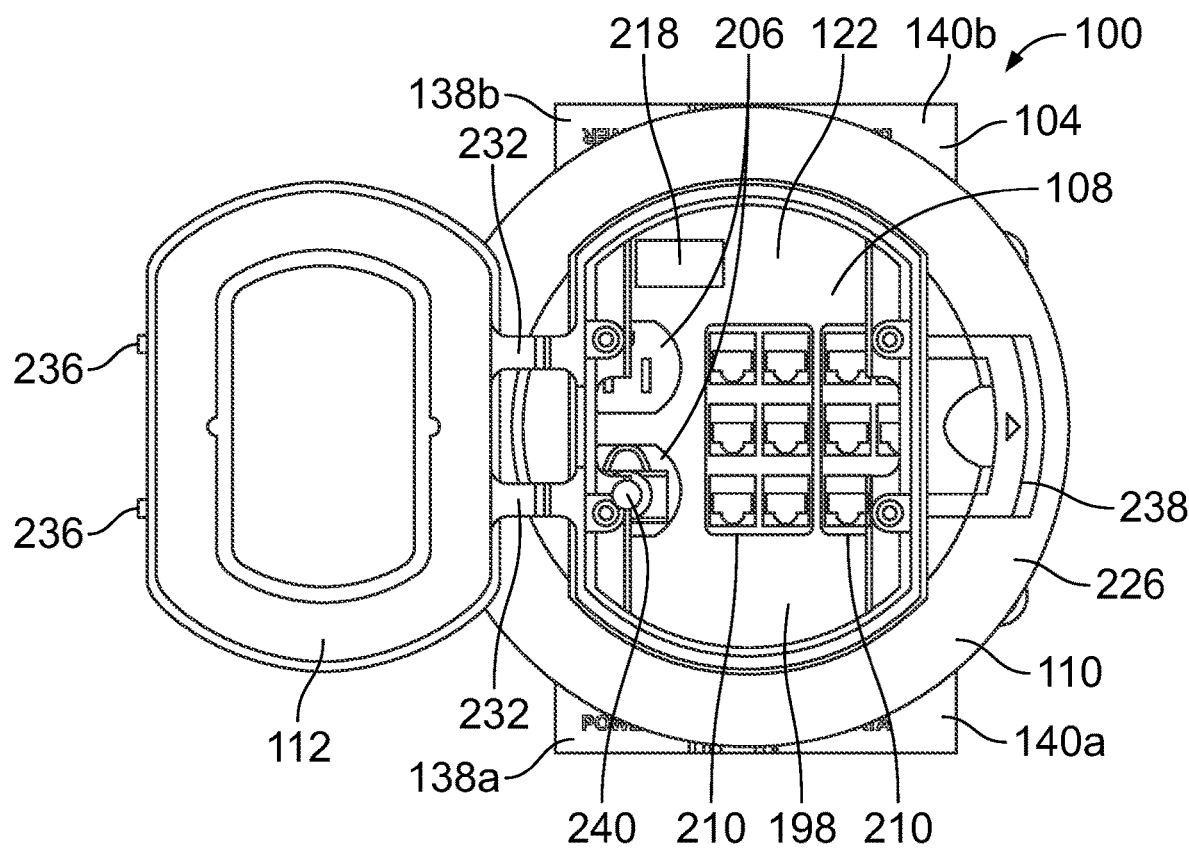
Figure 15:
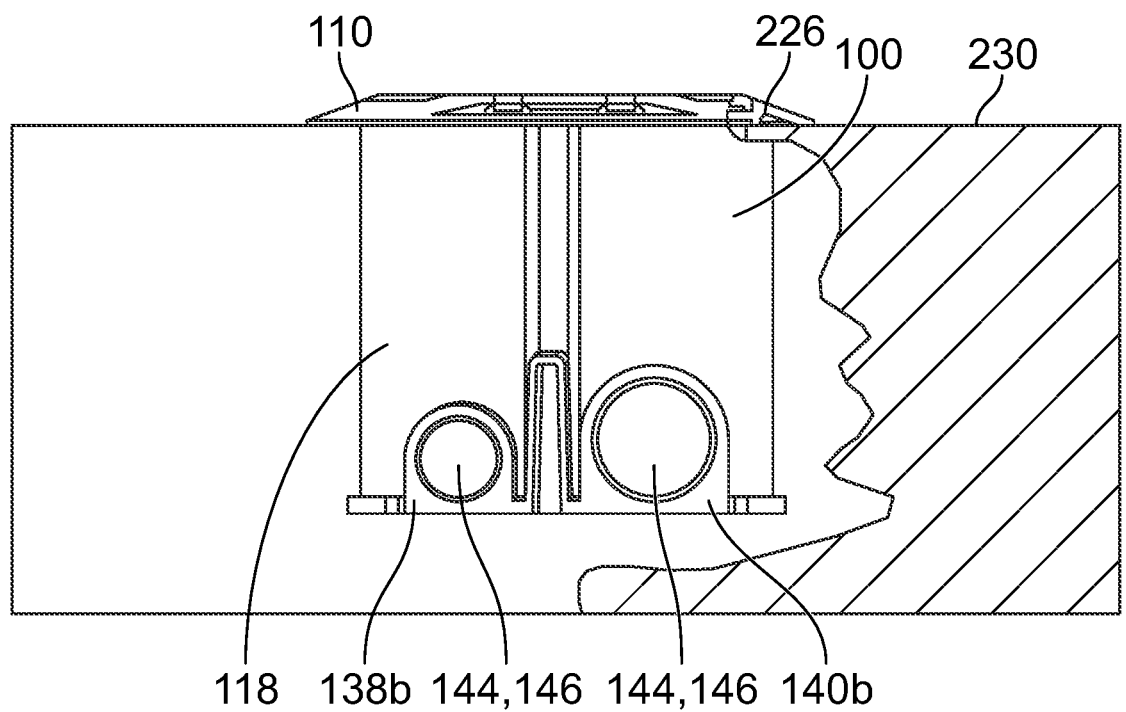
FIG. 15 illustrates a side view of the modular floor box assembly shown in at least FIG. 13 installed in a floor according to an embodiment of the present application.

As shown in at least FIGS. 1, 13, and 14, the modular floor box assembly 100 can also include a cover flange 110 that can be secured about the upper portion 124 of the sidewall 118 of the housing 104. For example, according to certain embodiments, the cover flange 110 can include a recess or groove in a flange 226 of the cover flange 110 that can relatively securely receive placement of, or be positioned around, at least a portion of the upper portion 124 of the sidewall 118 of the housing 104. The flange 226 can include an opening 228 that is positioned to be in fluid communication with the interior region 122 such that cables can pass through the opening 228 of the flange 226 and into, or out of, the interior region 122 of the housing 104. Further, according to certain embodiments, the flange 226 can have a size, such as, for example, a diameter, that is larger than a corresponding size of the sidewall 118 of the housing 104, such that the flange 226 extends over an interface or space between the sidewall 118 and the adjacent portion of the floor 230 into which the floor box 102 is installed, as shown in FIG. 15.

According to certain embodiments, the cover flange 110 can include a selectively displaceable cover lid 112. For example, according to the depicted embodiment, the cover lid 112 can be pivotally coupled or tethered to the cover flange 110 by a one or more arms or cables 232 or a hinge such that the cover lid 112 can be displaced from a closed position at which the cover lid 112 covers the opening 130 of the interior region 122 of the housing 104 so as to prevent ingress/egress into/from the interior region 122, to an open position (FIGS. 13 and 14) at which at least a portion of the cover lid 112 has been moved to a position away from the opening 130 of the interior region 122. Alternatively, according to other embodiments, the cover flange 110 can be pivotally coupled to the housing 104, such as, for example, via a hinge, such that the cover flange 110 and the cover lid 112 can be pivoted away from the interior region 122. Additionally, the cover lid 112 and/or cover flange 110 can include a gasket that can be configured to at least prevent or minimize the ingress of debris or fluid into the interior region 122 of the housing 104. Additionally, the cover flange 110 can include a latch system that can assist in retaining the cover lid 112 in a closed position. According to certain embodiments, the latch system can include one or more tabs 236 on the cover lid 112 and a slideable retainer 238 on the cover flange 110. When in the cover flange 110 is in the closed position, the slideable retainer 238 can be in a first position at which the retainer 238 extends over the one or more tabs 236 of the cover lid 112 so as to provide interference against the cover lid 112 being displaced to the open position. When the cover lid 112 is to be opened, the retainer 238 can be slid in a generally outwardly direction to a second position away from the tabs 238 so that the retainer 238 no longer extends over the tabs 236, and thus the retainer 238 no longer interferes with the cover lid 112 being displaced to the open position. According to certain embodiments, a biasing member, such as, for example, a spring, may bias the retainer 238 toward the first position. Further, while the foregoing provides an exemplary embodiment for the latch system, the latch system can have a variety of other configurations and components to assist in selectively retaining the cover lid 112 in the closed position, including, but not limited to, embodiments in which the cover lid 112 can be rotated between locked and unlocked positions, and in which the cover lid 112 may be removed from the cover lid 112 when in the unlocked position, or alternatively, be lifted to an open position while remaining connected or tethered to the cover flange 110.

While the foregoing examples discuss the power puck 108 and the cover flange 110 being separate components, according to another embodiment, the power puck 108 and cover flange 110 can be integrated into a single, unitary component. According to such an embodiment, assembly of the power puck 108 to the floor box 102, such as, for example, plugging the male receptacle 188 of the power puck 108 into the power deck 136, can coincide with the cover flange 110, and associated cover lid 112, being assembled to the housing 104. Such an embodiment can also include a self-leveling mechanism that can ensure that at least the cover flange 110 is relatively level with the surrounding floor surface when the power puck 108 is electrically coupled to the power deck 136. For example, according to certain embodiments, the power puck 108 can be pivotally coupled to the cover flange 110 such that, if needed, the power puck 108 can be angularly offset, including non-parallel, relative to the flange 226 of the cover flange 110.

Figure 6:
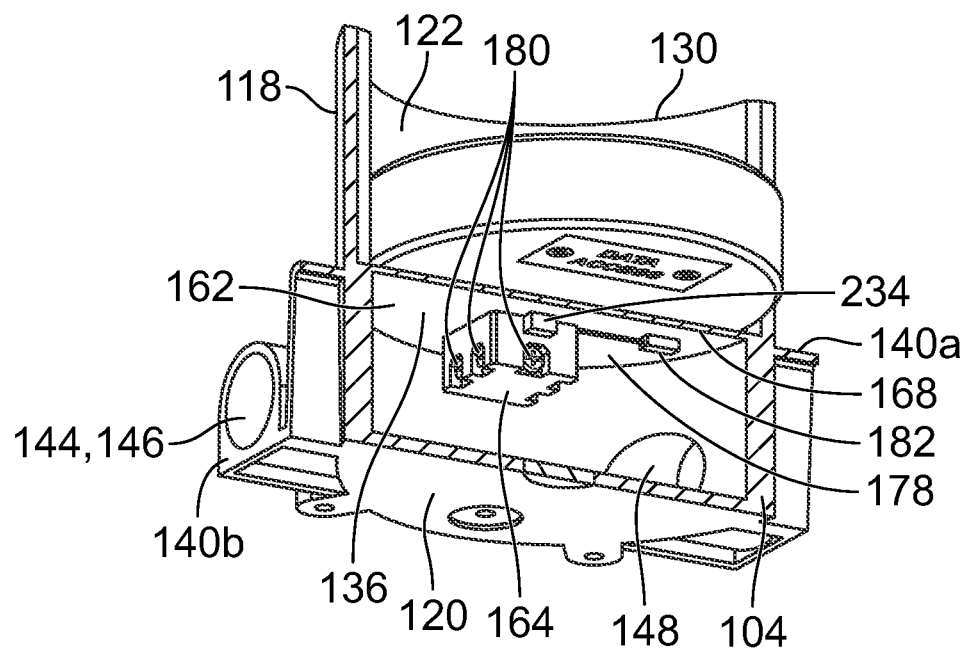
FIG. 6 illustrates a bottom side perspective view of a cross section of the housing and a perspective view of a portion of the power puck shown in FIG. 5 in an assembled position.

As seen in FIGS. 3 and 6, the modular floor box assembly 100 can also include one or more lighting devices 234 having a light bulb or source within the interior region 122 of the housing 104. Further, according to certain embodiments, the lighting device 234 can be powered via an electrical connection between the lighting device 234 and the power terminal block 164. Such a lighting device 234 can illuminate at least a portion of the interior region 122 of the housing 104 at least while a user is making electrical and/or data connections in, or with, the modular floor box assembly 100. The lighting device 234 can be positioned at a variety of locations within the housing 104, including, for example, above the power deck 136, on the power deck 136, or below the power deck 136. For example, according to certain embodiment, the lighting device 234 can be at a position at which the lighting device 234 provides a backlight within the housing 104.

As seen in FIG. 13, activation of the lighting device 234 can be controlled by a switch 240. According to certain embodiments, the switch 240 can be automatically activated and deactivated, or, alternatively, manually operated. For example, the light switch 240 can be positioned for engagement by, or release from engagement with, the cover lid 112 of the cover flange 110 such that, upon displacement of the cover lid 112 to an open position, the switch 240 moves to a closed position, thereby resulting in illumination of the lighting device 234. Subsequent engagement with, or release from engagement with, the cover lid 112 as the cover lid 112 is returned to the closed position can facilitate the switch 240 moving to an open position, thereby ceasing illumination of the lighting device 234. Alternatively, the switch 240 can be configured for manual operation by a user such that the user can displace the switch 240 between open and closed positions by physically displacing at least a portion of the switch 240.

FIG. 15 illustrates an exemplary modular floor box assembly 100 installed in a floor 230. The modular floor box assembly 100 can be utilized with a variety of different types of floors, as well as installed at various times relative to the floor installation process. For example, according to certain embodiments in which the modular floor box assembly 100 is to be used with a concrete floor, the modular floor box assembly 100 can be positioned prior to the pouring of the concrete for the floor 230, in which case the poured concrete can cure around the modular floor box assembly 100. Alternatively, according to other embodiments, the modular floor box assembly 100 can be a poke-thru device that is positioned in a hole that is drilled into a hardened concrete floor 230. In other concrete floor applications, concrete for the floor 230 can be poured around a cast or mold, and the modular floor box assembly 100 can later be placed in the void in the concrete floor 230 that is/was provided by the cast or mold. The modular floor box assembly 100 can also be used with other types of floors or structural elements that can be constructed from a variety of materials, including for example, but not limited to, wood floor joists, wood subfloor decking, accessed floor construction, and raised floor concepts, among other types of floors and structures.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A modular floor box assembly comprising:
a floor box having a housing, the housing including an aperture and a plurality of fittings, each of the plurality of fittings having a passageway sized to receive a plurality of cables, the passageway being in fluid communication with an interior region of the housing;
a power deck having an upper surface and a lower surface opposite the upper surface and configured for placement within the interior region of the housing, the power deck including a female deck receptor on the upper surface, the female deck receptor being electrically coupled to one or more terminals located on the lower surface of the power deck that are configured for a hardwired connection within the interior region of the housing with at least one of the plurality of cables; and
a power puck sized for removable placement within the interior region of the housing, the power puck having a male receptacle configured for insertion into, and electrical coupling to, the female deck receptor, the power puck further including one or more electrical receptacles, the one or more electrical receptacles being electrically coupled to the male receptacle;
wherein the aperture comprises being disposed within the interior region between the power deck and an opposing inner surface of the housing, the aperture sized to accommodate passage of one or more data transmission cables, the aperture being in fluid communication with the passageway of at least one of the plurality of fittings.

2. The modular floor box assembly of claim 1, further including a power terminal block disposed on the lower surface, the one or more terminals being positioned on the power terminal block.

3. The modular floor box assembly of claim 2, wherein the power terminal block is attached to the power deck, and the power deck is removable from the housing.

4. The modular floor box assembly of claim 1, wherein the power deck further includes at least one status indicator, the at least one status indicator configured to provide a visual indication of a status of an electrical connection between at least one of the one or more terminals and at least one of the plurality of cables.

5. The modular floor box assembly of claim 4, wherein the power puck further includes a viewing window, the viewing window positioned to accommodate visual access to the at least one status indicator when the male receptacle is inserted into the female deck receptor.

6. The modular floor box assembly of claim 1, wherein the plurality of fittings comprise a first set of fittings and a second set of fittings, and wherein the modular floor box assembly further includes a voltage divider, the voltage divider positioned to separate, beneath the power deck, cables that extend into the interior region through any of the first set of fittings from other cables that extend into the interior region through any of the second set of fittings.

7. The modular floor box assembly of claim 1, wherein the power puck includes at least one data opening and at least one data receptacle positioned in the at least one data opening, the at least one data receptacle having one or more data connectors.

8. The modular floor box assembly of claim 1, wherein the one or more electrical receptacles comprises a power whip.

9. The modular floor box assembly of claim 1, wherein the floor box includes one or more lighting devices configured to selectively illuminate at least a portion of the interior region of the housing.

10. The modular floor box assembly of claim 1, further comprising a cover flange pivotally coupled to a displaceable cover lid, the cover flange being secured to an upper portion of a sidewall of the housing.

11. A modular floor box assembly comprising:
- a floor box having a housing, a first fitting, and a second fitting, the housing having a sidewall, an aperture, and a bottom wall, the sidewall and the bottom wall defining an interior region of the housing, each of the first fitting and the second fitting having a passageway that is in fluid communication with the interior region;
- a power deck having a deck housing having an upper surface and a lower surface opposite the upper surface, the deck housing having a female deck receptor on the upper surface;
- a power terminal block having a plurality of terminals, each terminal of the plurality of terminals being configured for a hardwired connection with a power transmission cable received into the interior region of the housing through the first fitting, the power terminal block being located on the lower surface of the power deck and being electrically coupled to the female deck receptor; and
- a power puck having a male receptacle sized and positioned to be plugged into the female deck receptor to electrically couple the male receptacle to the female deck receptor, the power puck being selectively removable from the floor box and further including one or more electrical receptacles electrically coupled to the male receptacle and at least one data opening;
- wherein the aperture comprises being disposed within the interior region between the power deck and an opposing inner surface of the housing, the aperture sized to accommodate passage of one or more data transmission cables, the aperture being in fluid communication with the passageway of at least one of the first fitting and the second fitting.

12. The modular floor box assembly of claim 11, wherein the power terminal block is attached to the deck housing.

13. The modular floor box assembly of claim 11, wherein the first fitting comprises a first set of fittings, and the second fitting comprises a second set of fittings.

14. The modular floor box assembly of claim 11, wherein the power deck further includes at least one status indicator, the at least one status indicator configured to provide a visual indication of a status of an electrical connection between at least one of the plurality of terminals and the power transmission cable.

15. The modular floor box assembly of claim 14, wherein the at least one status indicator comprises an array of status indicator lights.

16. The modular floor box assembly of claim 14, wherein the power puck further includes a viewing window, the viewing window positioned to accommodate visual access to the at least one status indicator when the male receptacle is plugged into the female deck receptor.

17. A method comprising:
- hardwiring one or more power transmission cables to a power terminal block, the power terminal block being electrically coupled to a power deck of a floor box, the power terminal block being located on a lower surface of the power deck;
- positioning one or more data transmission cables in an interior region of the floor box;
- inserting a power puck into the interior region of the floor box;
- plugging, with the power deck in the interior region of the floor box, a male receptacle of the power puck into a female deck receptor of the power deck, the female deck receptor being electrically coupled to the power terminal block;
- connecting an electrical receptacle of the power puck to a power cable for an external device, the electrical receptacle being electrically coupled to the male receptacle; and
- inserting the one or more data transmission cables through an aperture between the power deck and an interior surface of the floor box, and into a data opening in the power puck.

18. The method of claim 17, further comprising:
- unplugging the male receptacle of the power puck from the female deck receptor of the power deck while electrical power is being delivered to the power terminal block; and
- plugging the male receptacle of the power puck, or plugging a male receptacle of another power puck, into the female deck receptor of the power deck while electrical power continues to be delivered to the power terminal block.

19. The method of claim 17, further comprising connecting the one or more data transmission cables to one or more data receptacles positioned at least partially in the data opening of the power puck.

20. The method of claim 17, further comprising pulling the one or more data transmission cables through the power puck and out of the floor box.

* * * * *